(12) United States Patent
Culver

(10) Patent No.: US 6,809,853 B2
(45) Date of Patent: Oct. 26, 2004

(54) OPTICAL SWITCH

(75) Inventor: William H. Culver, Washington, DC (US)

(73) Assignee: Comptic, Inc., Washington, DC (US)

( * ) Notice: Subject to any disclaimer, the term of this patent is extended or adjusted under 35 U.S.C. 154(b) by 12 days.

(21) Appl. No.: 10/115,249

(22) Filed: Apr. 4, 2002

(65) Prior Publication Data

US 2003/0190115 A1 Oct. 9, 2003

(51) Int. Cl.[7] .............................................. G02B 26/00
(52) U.S. Cl. ...................... 359/291; 359/260; 359/320; 385/18
(58) Field of Search ................................. 359/291, 245, 359/260, 261, 263, 315, 317, 318, 320, 223; 385/18

(56) References Cited

U.S. PATENT DOCUMENTS

| | | | |
|---|---|---|---|
| 3,299,368 | A | 1/1967 | Klebba |
| 4,404,402 | A | 9/1983 | Ladner et al. |
| 4,498,730 | A | 2/1985 | Tanaka et al. |
| 5,506,919 | A | 4/1996 | Roberts |
| 5,943,155 | A | 8/1999 | Goossen |
| 6,020,986 | A | 2/2000 | Ball |
| 6,075,424 | A | 6/2000 | Hampel et al. |
| 6,268,952 | B1 | 7/2001 | Godil et al. |
| 6,317,251 | B1 * | 11/2001 | Wang .......................... 359/318 |
| 6,603,894 | B1 * | 8/2003 | Pu ............................... 385/18 |

OTHER PUBLICATIONS

U.S. patent application Ser. No. 09/689,692, William H. Culver, et al., filed Oct. 13, 2000.
Peter Fairley, "The Microphotonics Revolution", Jul./Aug. 2000, Technology Review and Optics Letters Article.
David J. Bishop, Optical MEMS for Lightwave Networks, Nov. 8, 2000.

J.U. Kim & M.S. Park, Silicon Modulator Based on Mechanically–Active Anti–Reflection Switch for Fiber–in–the–loop Application (Mechanical Anti–Reflection Switch), pp. 1–3 (Aug. 24, 2001).
James A. Thomas et al., "Programmable diffractive optical element using a multichannel lanthanum–modified lead zirconate titanate phase modulator", Jul. 1, 1995, Optics Letters.
Feiling Wang et al., "Thin ferroelectric interferometer for spatial light modulations", Nov. 10, 1998, Applied Optics.

* cited by examiner

Primary Examiner—Scott J. Sugarman
Assistant Examiner—Richard Hanig
(74) Attorney, Agent, or Firm—Staas & Halsey LLP

(57) ABSTRACT

An optical switch for an optical network, which can switch a light beam from and input fiber to an output fiber quickly and without expensive intermediate conversions to electrical form. The optical switch changes the relative phase of the individual portions of a cross section of a wave front of a beam using wave front interference and can be used in packet switching with switching speeds of about 10 nanoseconds. These optical switches use a phase spatial light modulators (PSLM) that include an array of phase shifting elements preferably of Gires-Tournois interferometers. Each of the phase shifting elements has either a stationary reflective surface with a movable reflective surface or an electrorefractive medium sandwiched between two stationary surfaces. In the first embodiment, the stationary reflective surface with a movable reflective surface is kept a known distance apart by applied potential. In the second embodiment, an applied potential across the electrorefractive medium changes the optical wave path length of the phase shifting element. In a third embodiment, a prism or other spectral dispersing element is used to spectrally separate different wavelengths of a beam carrying a wavelength division multiplexed signal in a Litrow configuration. A spatial light modular is then used to controllably steer the separated wavelengths to a desired directions.

29 Claims, 9 Drawing Sheets

OPTICAL SWITCH

CROSS-REFERENCE TO RELATED APPLICATIONS

U.S. Pat. No. 6,430,328, which is entitled An Optical Switch having a filing date of Oct. 13, 2000, and being invented by William H. Culver and Donald Cronin Schmadel, Jr., is herein incorporated by reference in its entirety.

BACKGROUND OF THE INVENTION

1. Field of the Invention

The present invention is directed to an optical switch and, more particularly, to an optical switch, which steers an optical beam from an input port to an output port without intermediate conversion to an electrical signal, by using phase changing phase spatial light modulators comprising interferometers (IPSLMs).

2. Description of the Related Art

Fiber optic infrastructures are being implemented for many communication networks, including packet switched networks such as the Internet. In these communication networks, optical signals imposed on light beams are transmitted along optical fibers. At network nodes, the optical signals arrive on input optical fibers and leave on output optical fibers. Routing of a signal between input and output fibers at these network nodes is generally performed by conversion of the light signal from an input fiber to an intermediate electrical form, and then switching is performed on the electrical signal which is then converted back into a light signal in the output fiber. These conversions are slow and expensive and constitute a major cost element of an optical fiber network.

An optical switch is needed which directly switches a beam of light between input and output fibers quickly and without conversion to an intermediate electrical signal.

One technique that has been developed for direct switching of an optical signal between input and output fibers employs rotating mirrors to direct a reflected light beam. However, because of the mass of the mirrors involved, a rotating mirror is not fast enough for most packet switching networks.

U.S. Pat. No. 6,430,328, which is herein incorporated by reference in its entirety, uses optical phase changing SLMs (PSLMs) beam reflectors in which optical switching is performed by changing the relative phase of the individual portions of the cross section of a wave front of a light beam. The phase change, which is produced by the movement of an array of small phase shifting elements, is proportional to their motion. The individual portions of the wave front are advanced twice the distance that each respective phase shifting elements is moved, and it is advanced in essentially the direction of motion of the phase shifting elements. An array of such phase changing elements placed in the beam can cause the phase of the beam to increase linearly across the individual portions of the cross section of the wave front of the beam, thus causing a light beam deflection. Because the phase shifting elements are small relative to a rotating mirror used in other switches, they have less mass and can be moved from one switch position to another much faster. In addition, the total motion of the phase shifting elements need not exceed one half wavelength of the light being switched, which is less than the motion of a substantial portion of a rotating mirror for an equivalent beam deflection. Thus the PSLM beam reflector can switch an optical beam into a desired direction much faster than an equivalent rotating mirror device. Because the throughput of a typical network can be limited by switching speed within the network, what is needed is an optical switch, which will switch from an input fiber to an output fiber faster. This can be done by decreasing the mass of phase shifting elements and by decreasing or substantially eliminating their movement.

SUMMARY OF THE INVENTION

It is an aspect of the present invention to perform optical switching for an optical network by interferometrically controlling the relative phase of the individual portions of the cross section of the wave front to steer a beam.

It is also an aspect of the present invention to provide an optical switching device to perform optical switching for an optical network by interferometrically controlling the relative phase of individual portions of the cross section of a wave front to steer a beam.

It is another aspect of the present invention to use interferometric phase spatial light modulators (IPSLMs) that include an array of phase shifting elements in such a manner that each of the phase shifting elements has a stationary reflective surface and a movable reflective surface which moves a maximum distance substantially less than one half of the wavelength of the light beam.

It is a further aspect of the present invention to use IPSLMs that use optical wave path changes to perform optical switching for an optical network by changing the relative phase of the individual portions of the cross section of the wave front of a beam.

It is another aspect of the present invention to use IPSLMs that use a material, which changes refractivity with applied electrical potential, to perform optical switching for an optical network by changing the relative phase of the individual portions of the cross section of the wave front of a beam.

It is also an aspect of the present invention to use IPSLMs that have an array of phase shifting elements comprised of interferometers to change the relative phase of individual portions of the cross section of the wave front of a beam to steer the beam in a desired direction.

It is another aspect of the present invention to use IPSLMs to perform optical switching of one optical fiber to another optical fiber in less than about 100 nanoseconds for an optical network by changing the relative phase of the individual portions of the cross section of the wave front of a beam.

It is an additional aspect of the present invention to use IPSLMs to perform optical switching of one optical fiber to another optical fiber in less than about 10 nanoseconds for an optical network by changing the relative phase of the individual portions of the cross section of the wave front of a beam.

It is an aspect of the present invention to provide either IPSLMs or PSLMs that include an array of phase shifting elements and a prism or other spectral dispersing element in a Litrow spectroscope configuration to deflect and also separate individual wavelengths of a wavelength division multiplexed (WDM) light signal.

It is also an aspect of the present invention to provide either IPSLMs or PSLMs that include an array of phase shifting elements to produce a wave front desired phase distribution by changing the relative phase of the individual portions of the cross section of the wave front of a beam.

The above objects can be attained by a system that includes one or more light modulators, IPSLMs or PSLMs, as optical reflectors in an optical switching system. One or more input light beams are deflected by one or more input optical reflectors. One or more output optical reflectors can further deflect the beam. Each reflector changes the direction of the light beam by changing the phase of the wave front segments by changing the optical wave path length of phase shifting elements relative to each other. The IPSLMs are comprised of interferometers and change the relative phase of portions of a beam wave front to steer the beam in a desired direction.

These together with other objects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 6:
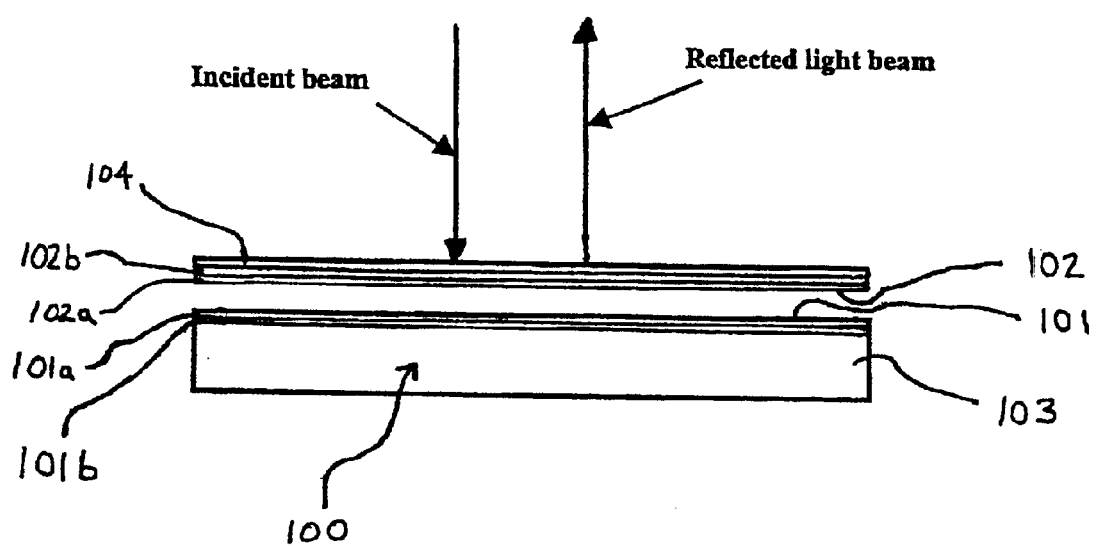
FIG. 6 depicts a first embodiment of a phase shifting element of the IPSLM according to the present invention.

The present invention optically switches a signal carrying light beam, such as a laser beam, between inputs and outputs, such as input and output optical fibers, by changing the direction of an optical beam. This is done by independently changing a phase of individual sections of the wave front of the light beam using an IPSLM formed with a plurality of phase shifting elements. In the present invention the PSLMs of U.S. Pat. No. 6,430,328 are replaced by IPSLMs, which shift the phase of the light beam reflected from each pixel by an interferometer, preferably a Gires-Tournois interferometer, whose cross section, for example, is shown in FIG. 6.

The advantage of using an array of small phase shifting elements each comprising a Gires-Tournois interferometer is that the elements can change the optical wave path length to a desired distance for the desired deflection angle much more rapidly than other types of devices including PSLMs. The Gires-Tournois IPSLM, like other PSLMs, has phase shifting elements such that no element of the IPSLM needs to advance the phase of the wave front by more than one wavelength of the light beam. In the Gires-Tournois IPSLM, the phase shift of the light beam is significantly larger than in a PSLM using a mirror for the same change in optical wave path length of a phase shifting element.

Other configurations for the optical switch are also possible such as a 3-D switch as shown and described in U.S. Pat. No. 6,430,328, where input and output fibers are arrayed in one or more two dimensional planes. Light from each of the input fibers is collimated into a beam that is incident on an input beam reflector which deflects the beam to the output beam reflector, which in turn deflects that beam into an output fiber associated with that output beam reflector. One or more relay mirrors or lenses may be in the optical path between the input beam reflectors and the output reflectors. The beam reflectors of U.S. patent application Ser. No. 09/689,694 are composed of one or more PSLMs in which optical switching is performed by changing the relative phase of the individual portions of the cross section of a wave front of a light beam incident on the PSLMs. The relative phase changes, which are produced by the movement of a two dimensional array of individual small phase shifting elements (pixels), preferably mirrors, can cause the phase of the reflected light beam to increase essentially linearly across the beam, thus resulting in a light beam deflection. In addition, it is possible to produce arbitrary desired wave fronts from a light beam by changing the phase of the relative phase shifting elements of an array of the PSLMs or IPSLMs.

Figure 1:
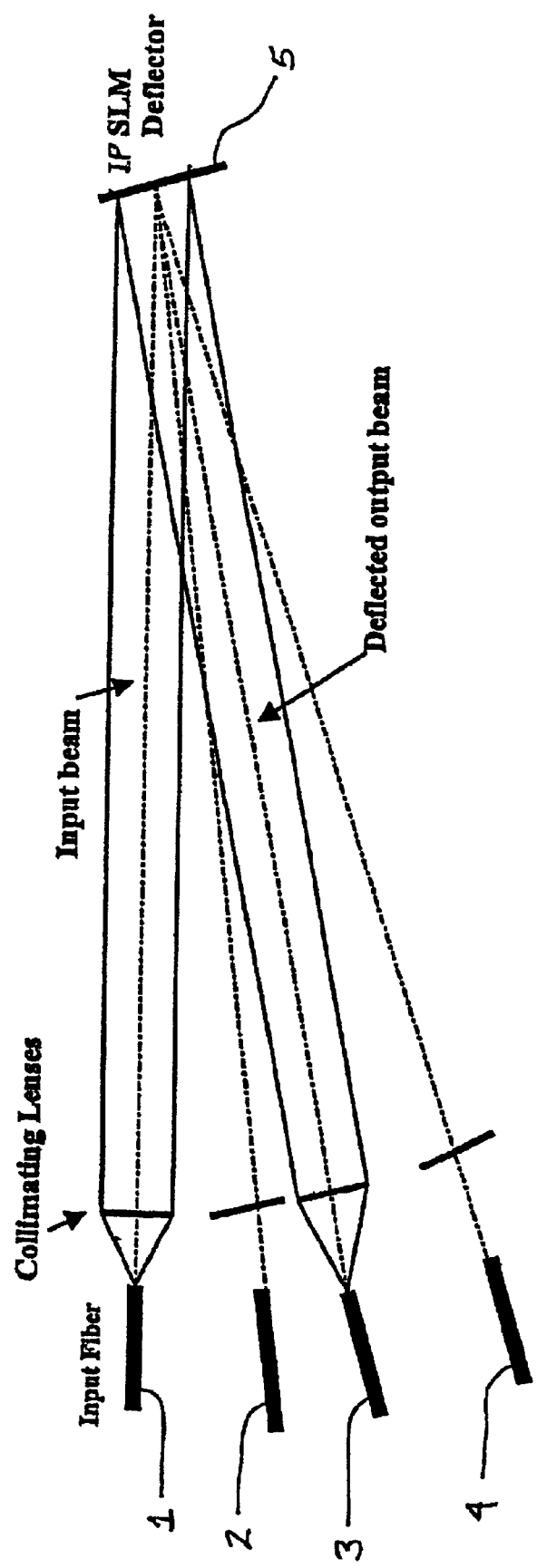
FIG. 1 depicts a beam-reflecting embodiment of a PSLM according to the present invention.

FIG. 1 depicts an embodiment of an optical switch, which can include a single PSLM reflector or an IPSLM reflector. This embodiment is particularly suitable for routing a single light beam from an input port 1 to one or more multiple output ports 2, 3 and 4. This optical switch has a single PSLM or IPSLM 5, and must be on the axes of the input port 1 and all of the output ports 2, 3 and 4. Such a switch can be used to switch a light beam between any set of two ports in either direction (bi-directional). If the ports 1, 2, 3 and 4 are equally spaced apart, then a connection is simultaneously made between any two ports that satisfy the relation port n to port (n+m). The reflector 5 is an array of phase shifting elements, which can include a micro lens array, having one lens per phase shifting element or be without the lenses. The array of ports 1, 2, 3, and 4 can be duplicated in the dimension perpendicular to the drawing allowing a greater number of ports. Alternatively the view shown can be duplicated in n parallel planes allowing for many input ports. In addition, IPSLMs are interchangeable with PSLMs, and can be used in all embodiments or PSLM configurations of an optical switch shown and described in U.S. patent application Ser. No. 09/689,694.

Figure 2:
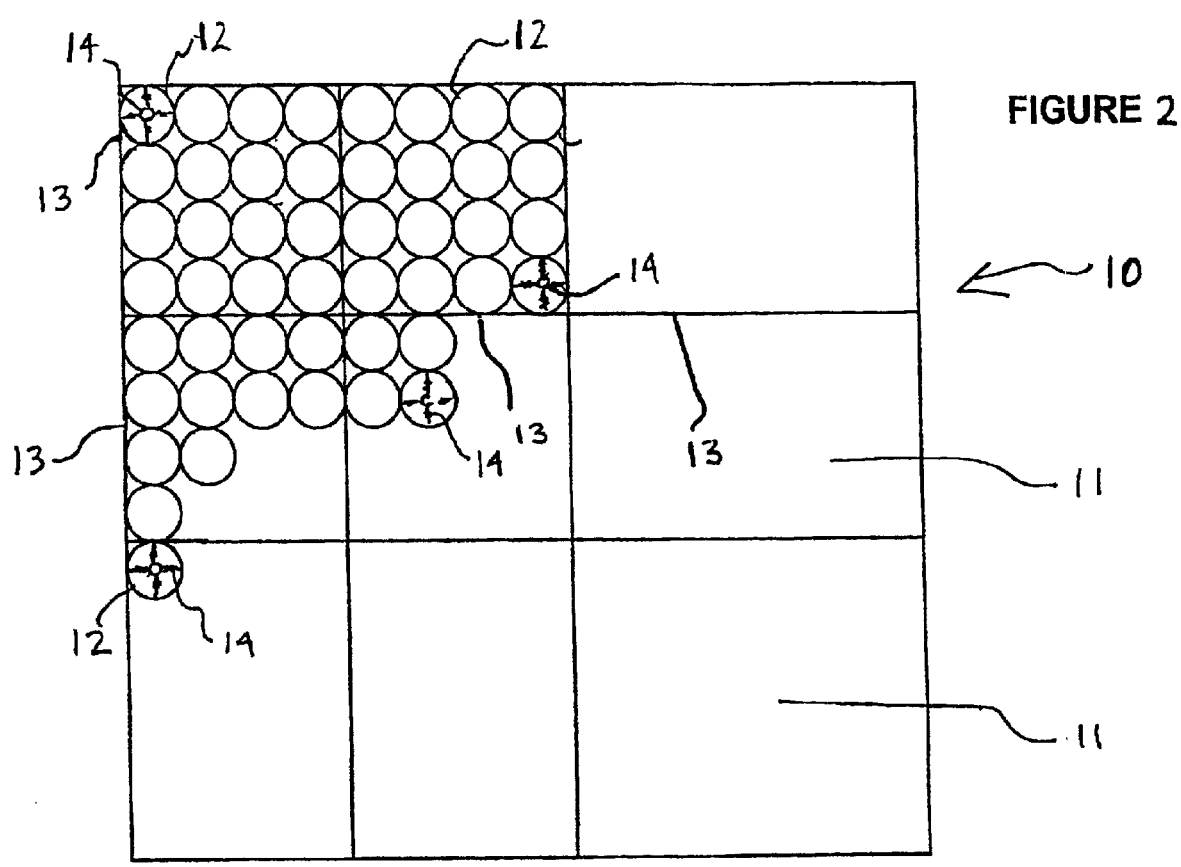
FIG. 2 depicts a plurality of pixel reflectors or IPSLMs comprising a plurality of arrays of interferometric phase shifting elements according to the present invention.

FIG. 2 shows a plan view of an IPSLM 10 comprising a plurality of reflectors 11 each of which is comprised of a 2-dimensional array of pixel phase shifting elements 12 using a Gires Tournois interferometer. In FIG. 2, the pixel reflectors 11 can be used either as input deflector arrays or output deflector arrays and they may be contiguous close packed circular pixels 12. However, other arrangements are possible including rectangular and hexagonal. Separation strips 13 may be desired between individual reflectors 11. The pixels 12 within each reflector 11 should be contiguous and occupy as much of the surface as possible to obtain the highest optical throughput efficiency. The phase shifting elements 12 have electrical isolation between adjacent first conducting electrodes 14 to allow for individual voltage control to control the phase of individual portions of the wave front segments of the light beam. The second conducting electrodes from each of the phase shifting elements may be commonly connected.

Figure 3A:
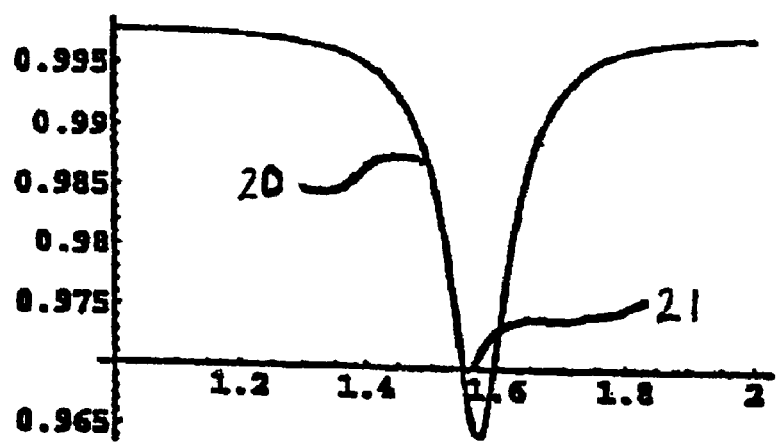
FIGS. 3A and 3B shows the calculated wave front interference changes for an IPSLM light beam pixel including the variation in intensity and phase of the reflected beam when the optical path length is varied about optical resonance.
Figure 3B:
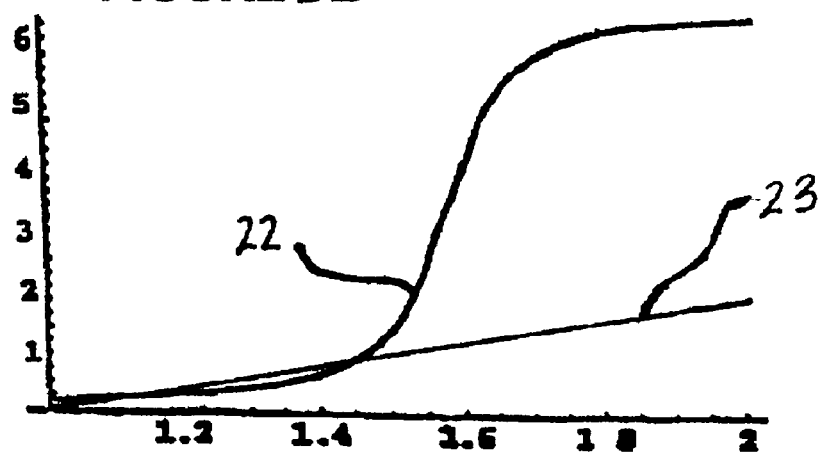
Figure 7:
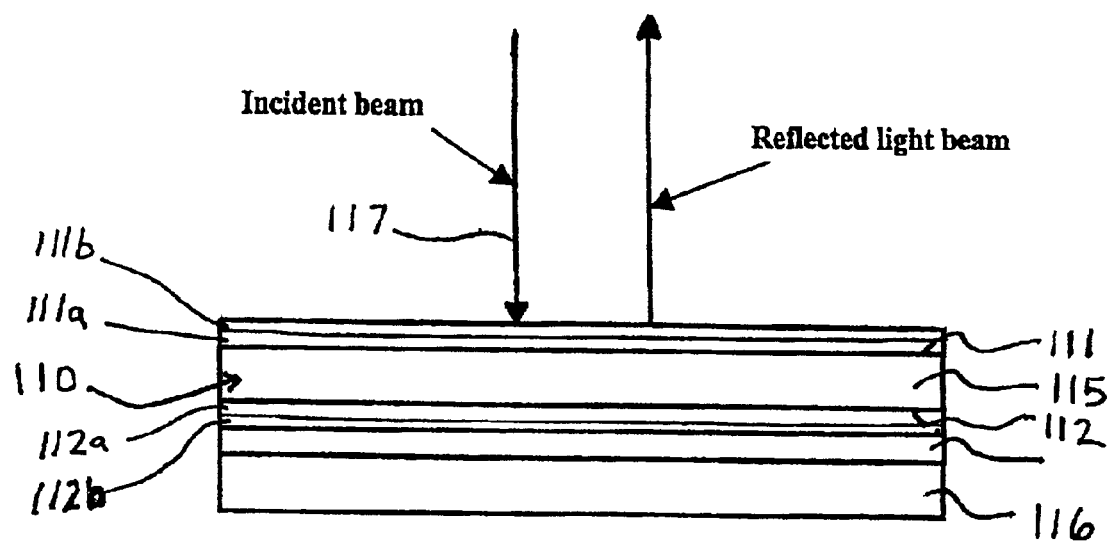
FIG. 7 depicts a second embodiment of a phase shifting element of the IPSLM according to the present invention.

FIG. 3B shows the calculated phase shift 22 of the reflected light of an IPSLM of the first and second embodiments shown in FIGS. 6 and 7, respectively. The phase shift 22 is in radians of optical phase as a function of the optical wave path length between the two reflective surfaces, which is measured in units of radians of optical wavelength. FIG. 3A shows the calculated reflectivity 20 of the interferometer as a function of the optical path length between the two reflective surfaces in units of radians of optical wavelength. Both of these calculations assumed the input reflector to have a reflectivity of 0.9 and the second reflector to have a reflectivity of 0.998. These calculations were based on principles well known to persons practiced in the art (see Principles of Optics, Born & Wolf, Pergamon Press, New York). Further, a second phase shift 23 is shown in FIG. 3B for a PSLM phase shifting element. The phase shift 22 for the same optical wave path length for an IPSLM is significantly larger than the phase shift 23 for a PSLM, thereby requiring less movement of each phase shifting element for the IPSLM and increasing the switching speed of a light beam switching between an input port and an output port.

The non-linear phase shifting 22 characteristic of a phase shifting element of an IPSLM, which is shown in FIG. 3B, is produced by wave front interference between the portion of the pixel of light reflected and/or refracted at the first reflective surface and the remaining portion, which is reflected at the second reflective surface.

Figure 4:
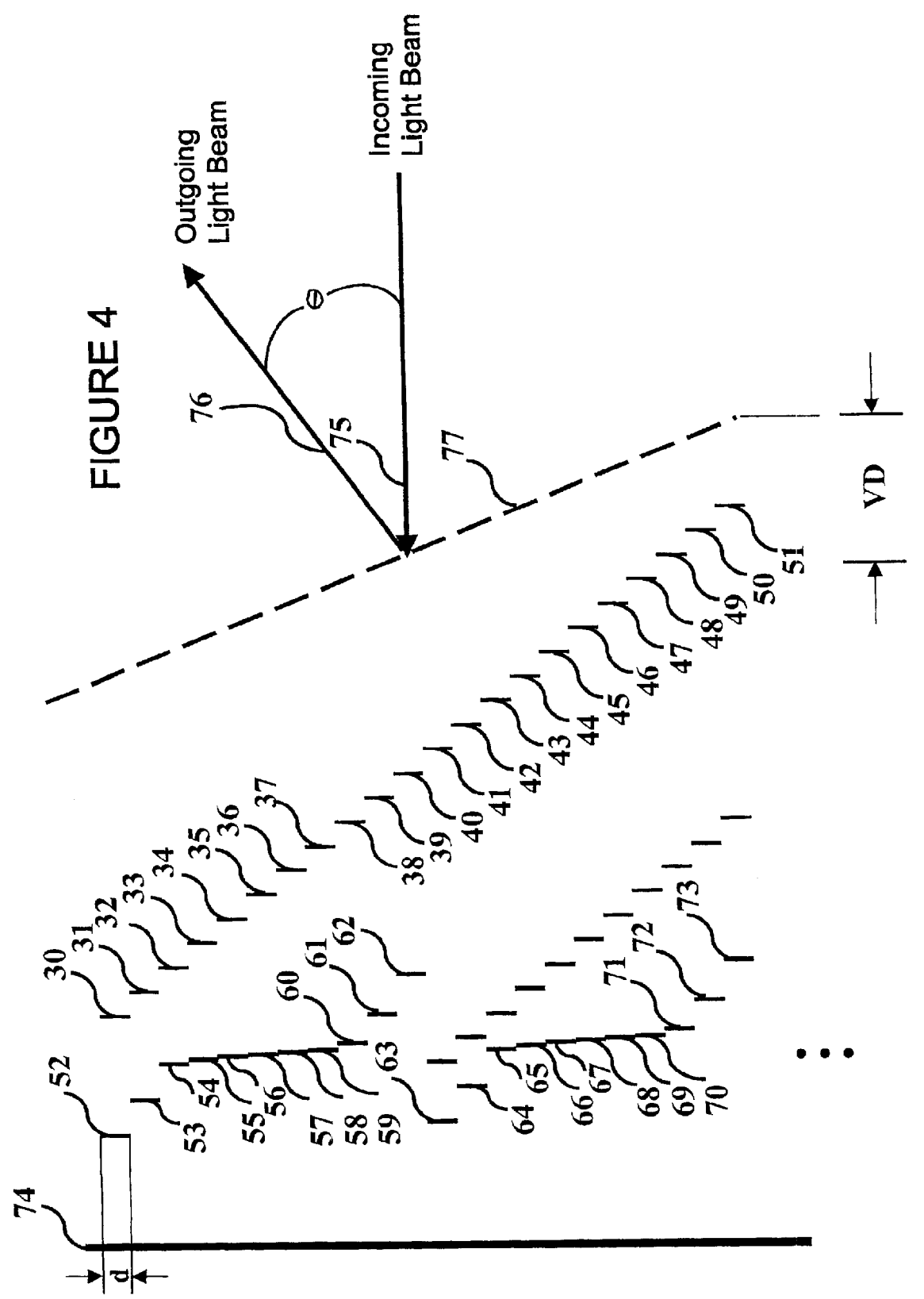
FIG. 4 depicts the operation of a pixel reflector or IPSLM using an array of interferometric phase shifting elements to change of the direction of a beam according to the present invention.

The operation of an IPSLM is depicted by the partial cross sectional view of FIG. 4 showing a portion of a reflective IPSLM. The IPSLM changes the phase of the individual portions of the wave front 30–51 of a beam 75 by changing the optical wave path length of small interferometers (opposite the beam of light 75 and behind reflective surfaces 52–73) in the path of the beam 75. The change in the optical wave path length of phase shifting interferometers can be accomplished either by changing the separation of the reflective surfaces 52–73 of each of the phase shifting elements or by changing the refractivity of a medium between the reflective surfaces (reflectors) of each of the phase shifting elements. The light beam 75 is "divided" into or by a series of pixels 30–51 that correspond to these reflectors 52–73. Each pixel 30–51 or each pixel reflector 52–73 has width d, which is preferably equal to many wavelengths of the light being deflected. The separation of the reflective surfaces of each of the pixel reflectors 52–73, which varies in distance from a reference position 74 having a second reflective surface, represents one-half the optical wave path length between the reflective surfaces 52–73 and second reflective surface 74. Each pixel reflector 52–73 can be either moved in a direction that is generally perpendicular to the reflective surface, thereby increasing the optical wave path length between the reflective surfaces 52–73 and second reflective surface 74 of the phase shifting element or has its optical wave path length changed by changing the refractivity of a medium. When a successive pixel reflector increases the optical wave path length relative to a previous pixel reflector, such as depicted for the pixel reflectors 61 and 62 respectively, successive wave front elements (portions of the incoming beam) 30–51 will be relatively phase advanced by an amount according to the phase shifting characteristic shown in FIG. 3B. The relative wave front displacement for a change in the optical path length significantly increases near optical resonance because of the interferometric phase shifting elements. The phase change can be made to increase linearly across the beam, thus causing a deflection as shown in FIG. 4. The effect of the wave front displacements, which is caused by changes to the optical wave path length of the reflectors 52–73, is the creation of a virtual mirror 77 depicted by the dashed line in FIG. 4. The scale of FIG. 4 is distorted such that the distances perpendicular to the pixel reflecting surfaces is greatly enlarged for clarity.

When successive pixel reflectors, which are successively phase advanced, for example pixels 52–62, (see FIG. 4) cumulatively exceeds $\lambda/2$, where $\lambda$ is the wavelength of the light, the change in the phase advance for the nth element, such as pixel 63, is reduced by $\lambda/2$, that is to n$\delta$ modulo($\lambda/2$). Where $\lambda$ is the advance between adjacent segments of the virtual mirror and n$\delta$ modulo($\lambda/2$) is the remainder when n$\delta$ is divided by $\lambda/2$. Thus the change in optical wave path length need not be greater than $\lambda$. In FIG. 4, the incoming beam arrives via direction 75 and results in an outgoing beam being reflected in an exit direction 76 and again creating a virtual mirror 77 depicted by the dashed line in FIG. 4. That is, with this approach, the length that a pixel reflector 52–73 needs to be changed by is at most a $\lambda/2$ distance, which is a fraction of the length or virtual displacement VD that an edge of a rotating mirror is moved to produce the same angle of reflection. VD indicates the displacement of the virtual mirror 77. As a result, the angle of the beam can be changed much faster using an IPSLM compared to using a rotating mirror. The mass of the reflectors 52–73 may be much smaller than that of a stiff relatively massive rotating mirror and for this additional reason, the switching of the beam 76 is faster using an IPSLM. Further, the reflector elements of an IPSLM have a larger phase shift for the same change in optical wave path length over a half wavelength as compared to a PSLM, and therefore can deflect a beam of light more rapidly than a PSLM.

Figure 5:
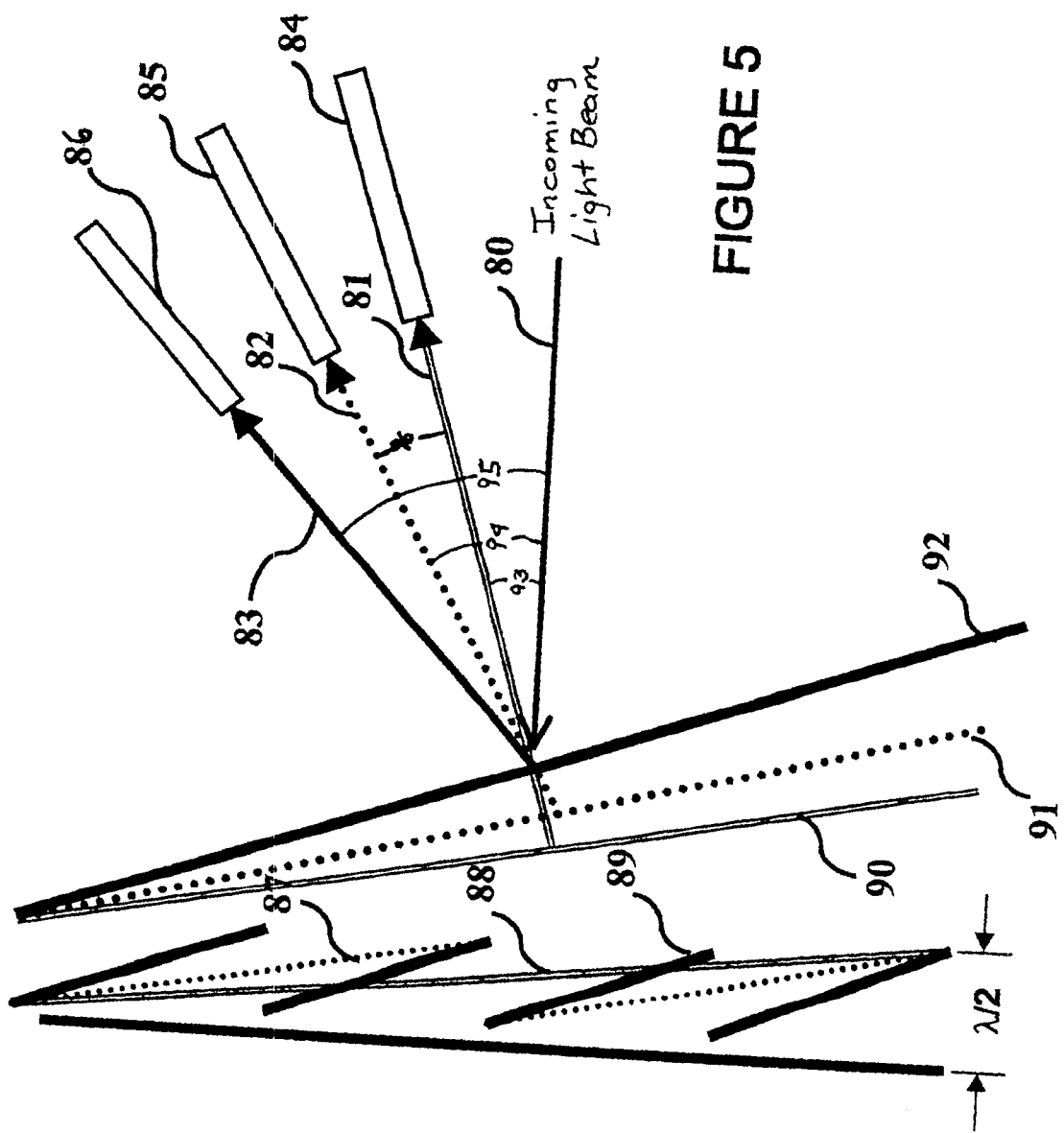
FIG. 5 depicts the modes of operation of an IPSLM, whereby the light beam can be controllably steered to a plurality of predetermined, resolvable positions.

In FIG. 5, the virtual mirrors 90–92 have essentially the same resolving power as a real plane mirror of the same diameter. A separate resolvable direction requires a motion of one side of that mirror with respect to the other side of $\lambda/2$. Thus for a reflector that is n pixels wide, $\delta$ should be chosen to be approximately multiples of $\lambda/(2*n)$ depending on the application. FIG. 5 is a plan view of the operation of an IPSLM with an array of interferometric phase shifting elements, and shows three modes 87–89 of the array of the phase shifting elements to produce separate resolvable directions 81–83, respectively, for the reflected light beam 80 where $\delta$ is chosen to be approximately 1, 2, and 3 times $\lambda/(2*n)$. Therefore, the smallest resolvable deflection angle 93 occurs when the change in optical wave path length is approximately $\lambda$ across the array of phase shifting elements. The next smallest resolvable deflection angle 96 occurs when the change in optical wave path length is approximately $\lambda$ across a submultiple of the array of phase shifting elements. Successively larger resolvable deflection angles, for example deflection angle 95, occur when the change in optical wave path length is approximately $\lambda$ across an even integer number of submultiples of the array of phase shifting elements.

FIG. 6, shows a cross section of an individual pixel Gires-Tournois interferometer phase shifting element 100. Reflective surfaces 101 and 102, which may be multilayer dielectric mirrors or metallic layers are movably mounted with respect to one another. The second reflective surface 101 is mounted on a substrate 103 used as the body of the phase shifting element 100. The first reflective surface 102 is on a transparent substrate of mass m, which can be made of silicon, and is supported displaced from surface 101 by compliant supporting members or springs (not shown), of combined spring constant, k=m*ω², where ω is the resonant frequency for oscillation of perpendicular motion of the substrate 103. Thus it is evident to someone skilled in the art that the mode of vibration of the structure that changes the separation of the reflective surfaces is ω. That vibration is approximately critically damped, for example, by controlling the density of air or other gas in the space around reflective surface 102. Electrically conducting layers 101a and 102a are placed between reflective surfaces 101 and 102 and their respective substrates 103 and 104. If the reflective surfaces are metallic they may also serve and replace the conducting layers. A controlled electrical potential is provided between the two conducting layers through electrical conductors 101b and 102b to control the separation distance by electrostatic forces between them. The first reflective surface 102 and substrate 104 must be partly transmissive and with a high, for instance a 90% reflectivity. In addition, it is advantageous for the second reflective surface 101 to be a mirror having a very high reflectivity, for instance 99.8%.

A second embodiment of a Gires-Tournois interferometer phase shifting element 110 of the present invention is shown in FIG. 7, having a space between two reflective surfaces 111 and 112, preferably multi-layer dielectric mirrors, filled with a medium such as a ferroelectric material which might include Lead Lanthinium Zirconium Tantilate (PLZT). Reflective surfaces 111 and 112 are substantially stationary with respect to one another. The second reflective surface 112 is mounted on a substrate 113 used as the body of the phase shifting element 110 and is under the medium 115. While the first reflective surface 111 is provided on top of the medium 115. The medium 115, which changes refractivity with applied electric potential, is sandwiched between the first and second reflective surfaces 111 and 112, respectively. Electrically conducting layer 111a is placed between reflective surface 111 and its respective substrate 113. An electrically conducting layer 112a is provided over reflective surface 112. A controlled electrical potential is provided between the two conducting layers 111a and 112a through electrical conductors 111b and 112b to control the refractivity separation distance (one-half the optical wave path length) by electrostatic forces between them. The first reflective surface 111 must be partly transmissive and with a high, for instance a 90% reflectivity. In addition, it is advantageous for the second reflective surface 112 to be a mirror having a very high reflectivity, for instance 99.8%.

The medium between the two reflective surfaces of each phase shifting element forms a resonance cavity 111, 112 and 115, and by changing the voltage applied across the medium 115 using the electrically conducting layers 111a and 112a, the optical wave path length can controllably change the phase of the reflected beam 118. The interferometer can be fabricated according to principles taught by Wang, "Thin ferroelectric interferometer for spatial light modulations", Applied Optics, Vol. 37, p. 7490, 10 November 1998. In particular, a device with a cross sectional area 30 by 30 micrometers, PLZT thickness of 2.5 micrometers and a 1 milliampere current for each of the phase shifting elements can be switched through the required path length change of one half wavelength in 10 nanoseconds.

Figure 8:
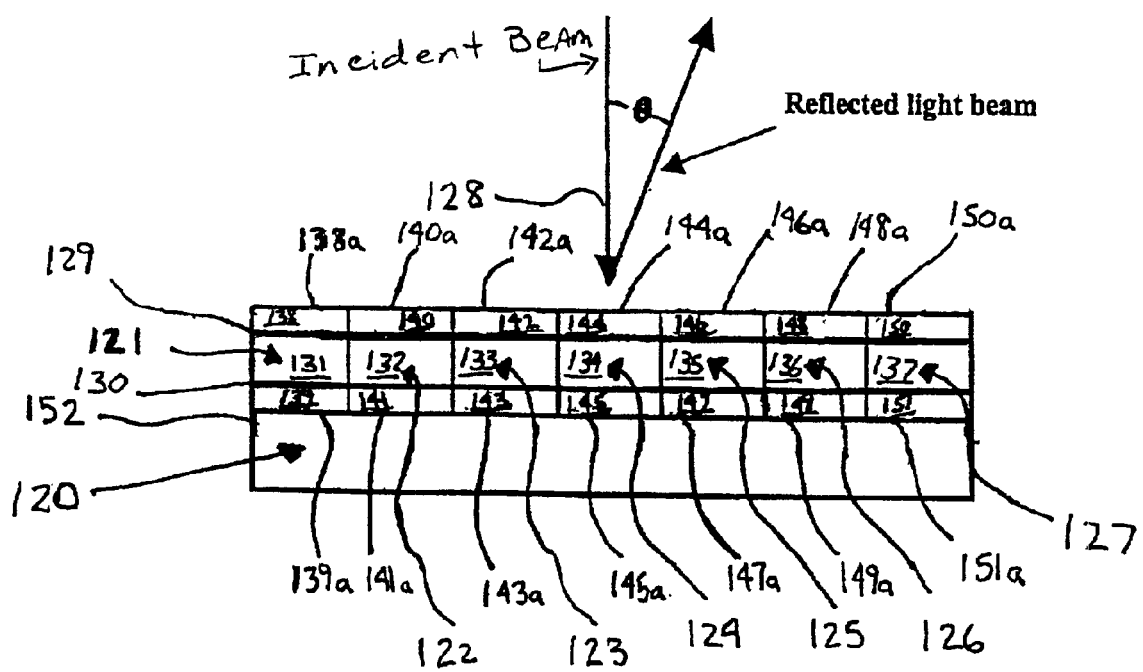
FIG. 8 depicts an IPSLM according to the second embodiment of the present invention.

FIG. 8 depicts an IPSLM 120 formed as an array of phase shifting elements 121–127 of the second embodiment without actively moving parts and has the advantage that the IPSLM 120 switching time to switch a light beam 128 from one input fiber to another output fiber can be reduced significantly (to 10 nanoseconds or less) because of the large electro-optic coefficient and the construction. It is advantageous that each of the phase shifting element areas be less than or equal to 40 micrometers square and that the current supplied to the respective conductive layer, for example conductive layer 138 and 139, which are electrically isolated from each other be less then 10 milliamperes. The IPSLM 120 of the second embodiment works by changing the direction of a light beam 128 by changing a phase through wave front interference of the optical wave front of individual pixels of the light beam 128, as in FIG. 4. The IPSLM is divided into pixels with each pixel phase modulating a small portion of the cross section of the light beam 128 incident on the IPSLM. Each pixel of the incident light beam 128 has a partially reflecting first mirror 129, which may be a mirror common to all pixels in a reflector or may be broken into separate mirrors for each pixel.

The phase of each segment of the wave front corresponding to each pixel is substantially determined by the optical wave optical path distances between the mirrors 129 and 130, which is varied by the applied electrical potential, since the media 131–137 chosen has a large electro-optic coefficient. By applying a potential across respective electrically isolated transparent conductive layers 138:139, 140:141, 142:143, 144:145, 146:147, 148:149, and 150:151, the optical wave path distance can be varied producing wave front phase changes in each pixel of the light beam 152. The transparent conductive layer is electrically connected to respective electrically isolated transparent conductive electrodes 138a–151a to supply electric potential across the media 131–137.

Figure 9:
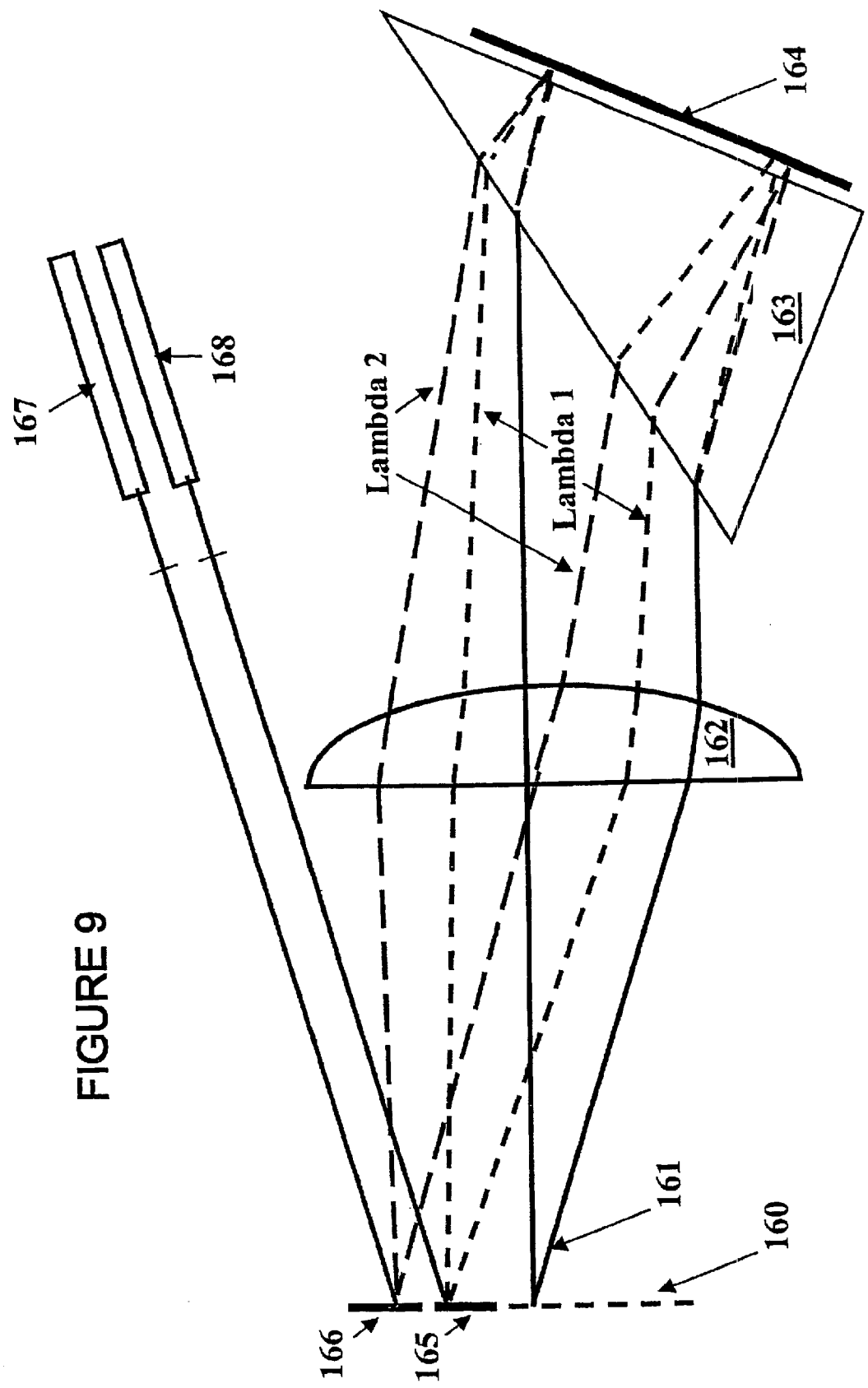
FIG. 9 shows a third embodiment of a switch using a PSLM or an IPSLM with a prism or other spectral dispersing element in a Litrow spectroscope configuration that can both separate out different wavelengths of a wavelength division optical signal and deflect them to different directions.

FIG. 9 shows the embodiment of an optical switch combined with a spectrograph to separate different wavelength channels in a WDM system. An input beam 160 from the input port 161, having two or more separate wavelengths Lambda 1, Lambda 2, etc is collimated by lens 162 into a beam that is incident on the input surface of a prism or other spectral dispersing element 163 where it is refracted and then is incident on a PSLM or IPSLM 164. Because of the chromatic dispersing of the prism or other spectral dispersing element 163, the two wavelengths, which are refracted at different angles within the prism or other spectral dispersing element 163, are incident on the PSLM or the IPSLM 164 at different directions. The PSLM or IPSLM 164 can controllably steer the two wavelengths together as an array of beams of separated wavelengths to different desired directions (in two dimensions) thereby exiting the prism or other spectral dispersing element 163 at different angles. The two wavelengths shown, which are reflected off of the PSLM or IPSLM 164 and exit the prism or other spectral dispersion element 163 at different angles, are focused by lens 162 onto either additional PSLMs or IPSLMs or output ports 165 and 166 at different positions. Those skilled in the art will recognize this device as a Litrow type spectrograph with the addition of the PSLMs or IPSLMs. Other means of spectral separation of wavelengths may also be used, for example, a diffraction grating or the like. The spectrograph separates out the input wavelengths, and the input wavelengths are directed onto positions 165 and 166, which as previously mentioned may be output ports or may be PSLMs or IPSLMs. The positions 165 and 166 are determined by the resolving power of the instrument. The PSLM or the IPSLM 164 allows the switching of the different wavelengths Lambda 1, Lambda 2, etc. to different positions 165, 166, 167, etc. The positions form an array which may be a two dimensional array of positions. Thus, an array of signals of different wavelengths may be positioned at different outputs. The addition of the PSLM or IPSLMs at positions 165 and 166 makes it possible to controllably steer the separated wavelengths of light of individual wavelengths to any one of a plurality of output ports 167 and 168. One skilled in the art will recognize that collimating lenses may be required at the input and output ports and PSLMs 165, 166, etc.

FIG. 9 is only diagrammatic and is intended to show the use of a PSLM or IPSLM to separate and switch signals of different wavelengths from a WDM signal. Concomitant use of PSLMs and IPSLMs for alternative combinations will be evident to persons skilled in the art, and can include the use of one or more PSLMs or IPSLMs in configurations shown in U.S. Pat. No 6,430,328 to steer a light beam from an input port to one or more output ports.

What is claimed is:

1. An apparatus, comprising:
   an optical switch controllably steering a direction of a light beam by interferometrically changing a phase and having an array of interferometers with each of the interferometers changing the phase of a portion of the beam.

2. An apparatus as recited in claim 1, wherein the beam is divided into pixels and each pixel comprises a spring held mirror having a position adjusted by depositing a known charge upon mirror electrodes and a backplane mirror spaced a known distances from the spring held mirror.

3. An apparatus as recited in claim 1, wherein the phase of the wave front is changed in segments by a plurality of phase shifting elements.

4. An apparatus as recited in claim 3, wherein each of the phase shifting elements have two reflective surfaces which produce wave front interference from the beam.

5. An apparatus as recited in claim 3, wherein each phase shift element comprises an assembly having a first mirror and second mirror substantially parallel to the first mirror, said mirrors movably mounted with respect to one another.

6. An apparatus as recited in claim 5, wherein a known distance of the mirrors of the phase shifting element is adjustable by depositing charge upon mirror electrodes.

7. An apparatus, as recited in claim 1, wherein said switch comprises an interferometric phase spatial light modulator changing the direction of the beam.

8. An apparatus as recited in claim 5, wherein the first mirror of the assembly is a spring held mirror having a position adjusted by a voltage.

9. An apparatus as recited in claim 5, wherein the first mirror of each phase shifting element has a reflectivity of about 90%.

10. An apparatus as recited in claim 5, wherein the second mirror of each phase shifting element has a reflectivity of about 99.9%.

11. An apparatus as recited in claim 5, wherein each phase shifting element is an interferometer.

12. An apparatus as recited in claim 5, wherein each phase shifting element is a Gires-Tournois interferometer.

13. An apparatus as recited in claim 1, wherein the beam is divided into pixels and each pixel comprises:
   a transparent substrate;
   a spring held mirror on the substrate having a position adjusted by depositing a known charge upon mirror electrodes; and
   a backplane mirror covering the substrate and between the substrate and the spring held mirror;
   wherein the mirrors of each pixel are spaced known distances.

14. An apparatus as recited in claim 1, wherein
   the beam steering is produced by changing optical wave path length in a plurality of phase shifting elements.

15. An apparatus as recited in claim 3, wherein wave front interference is produced by substantially reflections off the phase shifting elements of the incident beam of light.

16. An apparatus as recited in claim 1, wherein the beam steering is produced by wave front interference in a plurality of optical resonance cavities.

17. An optical switch, comprising:
   an array of phase shifting elements, each of said phase shifting elements comprising an interferometer shifting a portion of a wave front by interferometrically changing the direction of an optical beam.

18. An optical switch as recited in claim 17, wherein the phase shifting elements shift the beam from an input port to one of plural output ports.

19. An optical switch as recited in claim 17, wherein no phase shifting element is moved more that ¼ wavelength distance relative to adjoining phase shifting elements.

20. An optical switch as recited in claim 17, in which the movement of the phase shifting element is substantially eliminated.

21. An optical switch as recited in claim 17, wherein each of said phase shifting elements changes a length of an optical path of the beam.

22. A method, comprising:
   directing a plurality of pixels of a light beam at respective phase shifting elements comprising interferometers; and
   shifting the phase of each of the pixels of the light beam by a predetermined amount to controllably steer the light beam to a desired direction.

23. A method as recited in claim 22, wherein the shifting is caused by applying a potential to produce a known separation between reflective surfaces.

24. A method as recited in claim 22, wherein the shifting is caused by changing an optical length of the beam, reflective surfaces being substantially stationary with respect to one another.

25. An optical switch with a spectral dispersing element comprising;
   a plurality of spatial light modulators comprising interferometers;
   a lens;
   an input light beam having as least two wavelength channels passes through the lens;
   a spectral dispersing element configured between one or more of the spatial light modulators and the lens, the light beam, which enters the spectral dispersing element, produces chromatic dispersion of the at least two wavelength channels, the at least wavelength channels of the light beam, which are incident on the one or more spatial light modulators, are controllably steered back through the spectral dispersing element, after exiting the spectral dispersing element the at least two dispersion channels are focused by the lens on an array of desired positions.

26. An apparatus as recited in claim 1, wherein the optical switching speed of the beam from one output port to another output port is less than or equal to 10 nanoseconds.

27. An apparatus as recited in claim 1, wherein the optical switching speed of the beam from one output port to another output port is less than or equal to 100 nanoseconds.

28. An apparatus, comprising:
   an array of interferometric phase spatial light modulators which controllably produce a wave front desired phase distribution from a beam of light.

29. An apparatus as recited in claim 28 in which the array of interferometric phase spatial light modulators use Gires-Tournois interferometers.

* * * * *